L. R. EDDY.
SIFTING TOP.
APPLICATION FILED AUG. 4, 1920.
1,373,120. Patented Mar. 29, 1921.
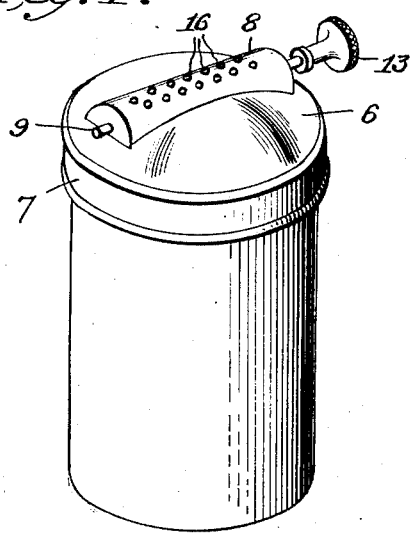
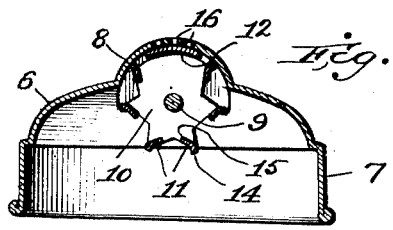
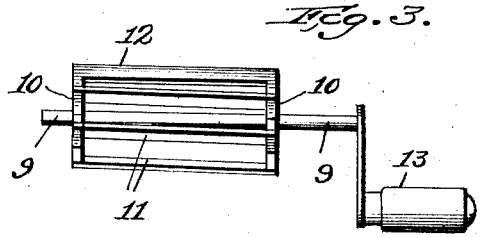
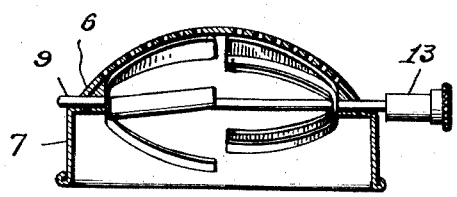
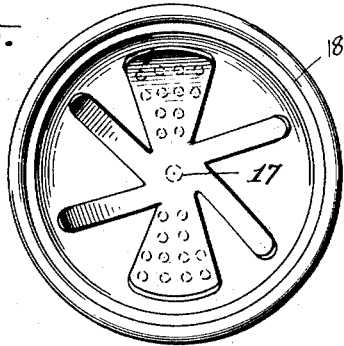
Inventor
Lawrence R. Eddy
By Edwin L. Jewell
his Attorney

UNITED STATES PATENT OFFICE.

LAWRENCE R. EDDY, OF ELIZABETH, NEW JERSEY.

SIFTING-TOP.

1,373,120.　　　Specification of Letters Patent.　　Patented Mar. 29, 1921.

Application filed August 4, 1920. Serial No. 401,228.

*To all whom it may concern:*

Be it known that I, LAWRENCE R. EDDY, a citizen of the United States, residing at Elizabeth, in the county of Union and State of New Jersey, have invented certain new and useful Improvements in Sifting-Tops, of which the following is a specification.

This invention relates to improvements in sifting tops for condiment holders, sugar and the like, and has for its particular object to provide an efficient device which is simple in construction and which will prevent clogging of the material adjacent the sifting apertures.

These objects are attained by the means illustrated in the accompanying drawings, in which:—

Figure 1 is a perspective view showing a container provided with the improved top.

Fig. 2 is a vertical cross-section through the top shown in Fig. 1.

Fig. 3 is a side elevation of the feed wheel.

Fig. 4 is a sectional view through the top and showing a modified form of feed wheel, and Fig. 5 is a view looking upon the inside of the top and showing another modified form of feed wheel.

Similar reference numerals in all of the figures of the drawing designate like parts.

Referring to Figs. 1 and 2, the top is formed with a dome 6 from which depends an annular flange or skirt 7, and transversely arranged across the dome 6 is a semi-cylindrical feed pocket 8 which is preferably constructed integral with the balance of the top. The top thus described is adapted to be snugly fitted upon a can or jar constructed of any suitable material and of any particular size to serve as a condiment holder, or for sugar, salt or flour sifter.

Mounted on a shaft 9, which extends longitudinally through the semi-cylindrical feed pocket 8, is a feed wheel formed of end-plates 10 connected together by the feed-slats 11 and a closure plate 12, said end-plates being fixed to the shaft 9 to rotate therewith, and the ends of said shaft 9 are journaled in the end-walls of the feed pocket, one of said ends being extended and provided with a knob or handle 13 by which the shaft and feed wheel is rotated. The feed-slats, bars or agitators, are each formed angular in cross-section to provide scraping edges 14 and cutting edges 15, and on opposite sides of the wheel said slats are arranged to lie in opposite directions, so that when the wheel is rotated back and forth, the slats on one side of the wheel are pushing the material toward the discharge apertures 16, while at the same time the cutting edges of the slats on the opposite side of the wheel are separating any lumps which may have formed in the material. Closure plate 12 is positioned between the oppositely positioned sets of slats, whereby the rows of apertures 16 extending longitudinally of the feed pocket can be closed. Feed slats 11 are also arranged on an incline from one end-plate 10 of the feed wheel to the other, so that the scraping edges 14 will engage the discharge apertures in each row successively as the feed wheel is rotated.

The modified form shown in Fig. 4 is somewhat similar to the Fig. 2 construction, excepting that the slats are not continuous from one end-plate to the other, but extend only to the center of the top from each side, and the slats on one side are staggered in relation to those on the opposite side. Also the slats rotate in dome, as in this form the semi-cylindrical pocket is not used.

In Fig. 5 construction, the plain dome type of top is used, and the feed wheel is journaled vertically and centrally in the dome on a shaft 17. The arms 18 of the feed wheel project tangently from the hub to form the inclined scraping edges, and the closure members are constructed wider than the feeding arms as shown in the other constructions described.

In operation the receptacle is, of course, inverted and the operating shafts are rotated back and forth to separate and push the material through the discharge apertures.

Having thus fully described the invention, what is claimed is:—

1. A sifting top comprising a portion having a plurality of rows of apertures, and a feed-wheel mounted to rotate in the top and provided with feed-arms and a closure member adapted to alternately engage over the apertured portion, said feed-arms having scraping edges inclined with respect to the apertured rows, whereby the scraping edges will successively engage the apertures in each row.

2. A sifting top, comprising an apertured portion, and a feed wheel mounted to rotate in the top and provided with feed-arms and a closure member adapted to alternately engage over the apertured portion, said feed-arms being angular in cross-section to form radial and tangential portions with respect to the axis of the feed-wheel and serving as scraping edges and cutting edges respectively when rotated in opposite directions, said feed-arms being oppositely positioned on opposite sides of the feed-wheel.

In testimony whereof I affix my signature.

LAWRENCE R. EDDY.